United States Patent [19]

Cote

[11] Patent Number: 4,483,243
[45] Date of Patent: Nov. 20, 1984

[54] APPARATUS FOR RISING DOUGH

[76] Inventor: Allan A. Cote, R.R. #2, Calgary, Alberta, Canada

[21] Appl. No.: 273,088

[22] Filed: Jun. 12, 1981

[51] Int. Cl.³ .......................... H05B 1/00; A21C 13/00
[52] U.S. Cl. ........................................ 99/468; 99/474; 99/476; 99/483; 219/401; 312/236; 426/418
[58] Field of Search .................. 99/467, 468, 473, 474, 99/475, 483; 312/31.1, 31.2, 31, 236; 219/401, 333, 362, 273; 34/151; 126/369, 348, 20; 426/418, 419

[56] References Cited

U.S. PATENT DOCUMENTS

| | | | |
|---|---|---|---|
| 3,456,598 | 7/1969 | MacKay | 99/483 |
| 3,518,949 | 7/1970 | Stock | 99/483 |
| 3,665,840 | 5/1972 | Horany | 99/479 |
| 3,805,686 | 4/1974 | West | 99/475 X |
| 3,958,028 | 5/1976 | Burg | 99/467 X |
| 4,373,430 | 2/1983 | Allen | 99/468 |

Primary Examiner—Timothy F. Simone

Attorney, Agent, or Firm—Brumbaugh, Graves, Donohue & Raymond

[57] ABSTRACT

A proofing apparatus for rising dough, comprising: an enclosure for containing the dough; a hot air supply inlet opening into the interior of the enclosure for causing the dough to rise; hot air ducting for connecting the hot air supply inlet opening directly to a hot air supply source; a hot air outlet opening from the interior of the enclosure; a probe for sensing the temperature in the interior of the enclosure; a control system responsive to the temperature sensing probe for regulating the inflow of the hot air through the hot air supply inlet in accordance with the temperature sensed by the temperature sensing probe; and a system for humidifying the interior of the enclosure. The proofing apparatus saves energy by using waste heat and obviates the need for a heat exchanger. The proofing environment can be accurately controlled. A process for rising dough in the proofing apparatus is also disclosed.

11 Claims, 8 Drawing Figures

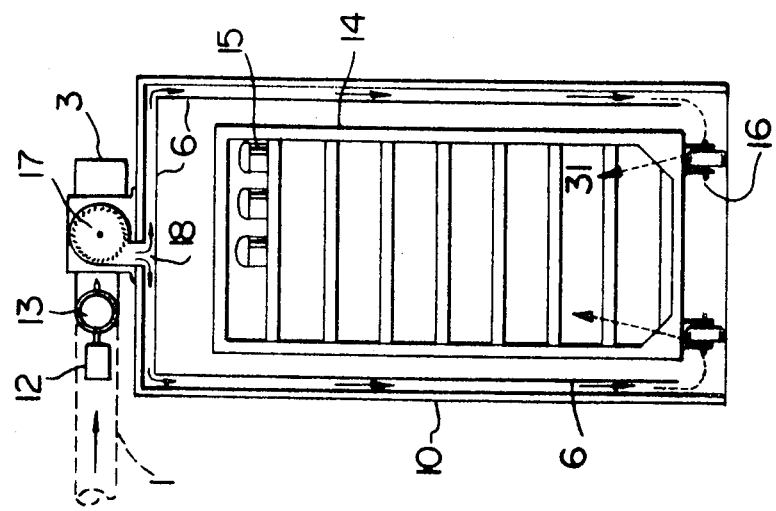
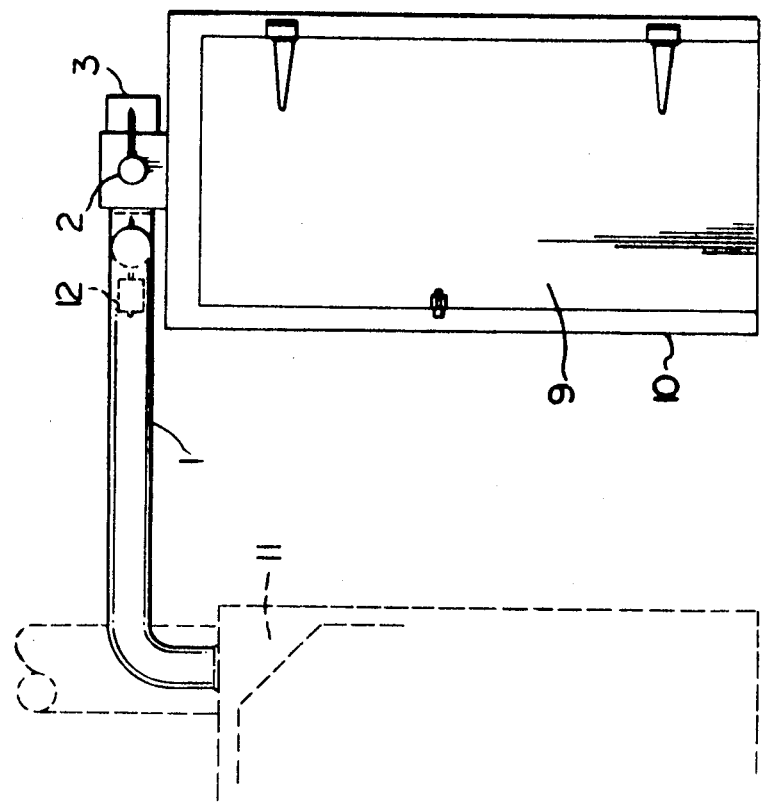
FIG. 2
FIG. 1

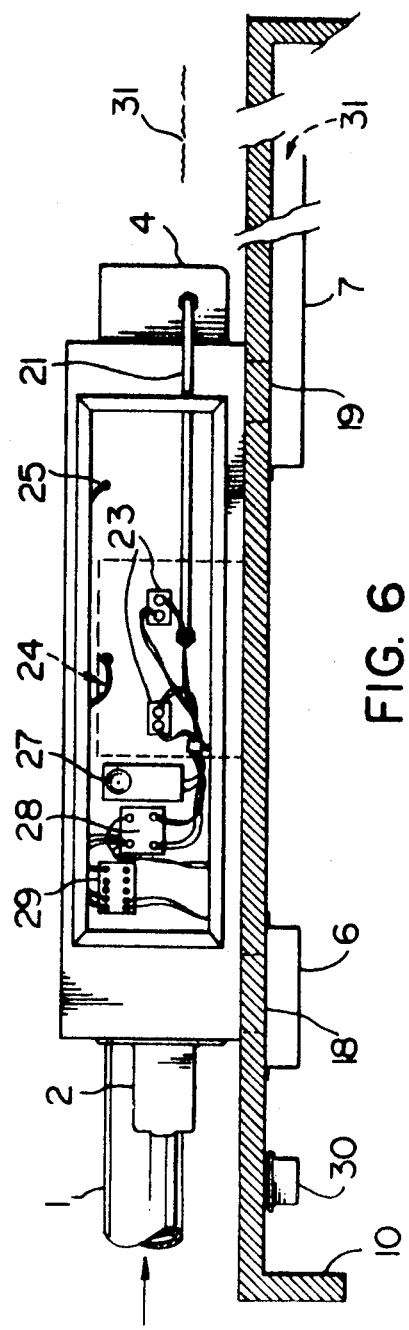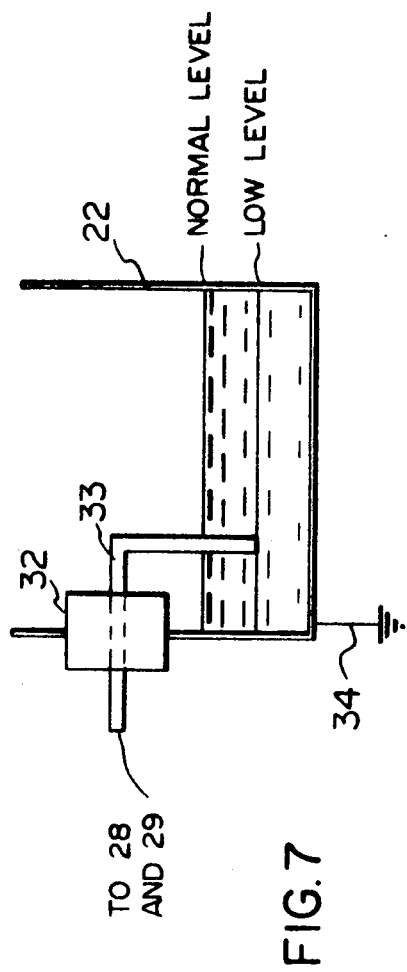
FIG. 6
FIG. 7

APPARATUS FOR RISING DOUGH

FIELD OF THE INVENTION

This invention relates to an apparatus and process for rising dough prior to baking.

BACKGROUND OF THE INVENTION

Prior to baking bread and other bakery products it is necessary to store the dough for a time in order that the dough may rise due to the reaction of the yeast contained therein. Generally the dough is stored at a temperature of about 38° C. and a relative humidity of about 90%. To obtain baked goods of consistent quality it is necessary to maintain the storage conditions of temperature and relative humidity substantially constant while rising the dough. In the mass production of baked goods the rising of the dough is termed proofing.

As noted above it is important to control the temperature and relative humidity of the proofing environment. Prior art proofing apparatus have attempted to do this by various means. For example, Pittendreigh, William John in Canadian Pat. No. 470,645 issued Jan. 9, 1951 teaches a method of controlling the relative humidity in a proofing apparatus by varying the surface area of hot water available for generating water vapor within the proofing apparatus. These attempts, however, have not proved to be completely satisfactory.

The heat energy required to maintain the proofing environment at, for example, 38° C. has in the prior art apparatus been provided by heat exchangers. The primary heat for the heat exchangers has been obtained from a heat source using oil, gas, electricity or the like. However, if the excess heat produced, for example, by a baking oven could be directly utilized to increase and maintain the proofing environment temperature then a saving of energy would result and heat exchangers would not be required.

Prior art proofing apparatus have relied on visual inspection of the dough to determine its readiness for baking. However, if the dough could be removed from the proofing apparatus after a pre-determined length of time the need for such visual inspection would be obviated and therefore the efficiency of a bakery could be increased.

SUMMARY OF THE INVENTION

Accordingly, an object of the present invention is to obviate or mitigate the above described disadvantages of the prior art.

According to an aspect of the invention there is provided a proofing apparatus for rising dough, comprising: an enclosure for containing the dough; a hot air supply inlet opening into the interior of the enclosure for causing the dough to rise; hot air ducting means for connecting the hot air supply inlet opening directly to a hot air supply source; a hot air outlet opening from the interior of the enclosure; means for sensing the temperature in the interior of the enclosure; control means responsive to the temperature sensing means for regulating the inflow of the hot air through the hot air supply inlet in accordance with the temperature sensed by the temperature sensing means; and means for humidifying the interior of the enclosure.

According to a further aspect of the invention there is provided a process for rising dough in the above described apparatus.

BRIEF DESCRIPTION OF THE DRAWINGS

Embodiments of the invention will now be described by way of example with reference to the accompanying drawings in which:

FIG. 1 is an elevation of the exterior of a proofing apparatus according to one embodiment of the invention;

FIG. 2 is an elevation of the interior of the proofing apparatus of FIG. 1;

FIG. 6 is a right end elevation of the upper part of the proofing apparatus of FIG. 1;

FIG. 7 is a schematic representation of a low water sensing arrangement for the proofing apparatus of FIG. 1.

DETAILED DESCRIPTION OF THE PREFERRED EMBODIMENT

Figure 3:
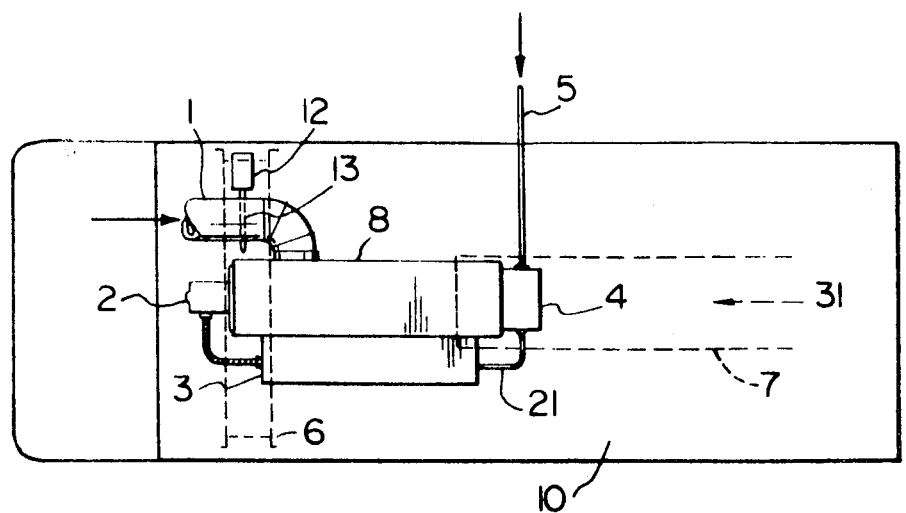
FIG. 3 is a plan of the exterior of the proofing apparatus of FIG. 1.

The embodiment of the invention shown in FIG. 1 comprises an insulated proof box 10 with a door 9. The proof box 10 and door 9 can be made from any suitable insulating material such as, for example, laminated aluminum and styrofoam.

A heat source 11 supplies hot air via conduit 1 to the proof box 10. The heat source is conveniently a baking oven. Of course, the heat source 11 need not be a baking oven; any suitable heat source located relatively close to the proof box 10 will suffice. However, the heat source 11 should, preferably, be capable of supplying hot air at a mininum temperature of approximately 150° C.

FIG. 2 shows a rack 14 mounted on wheels 16 inside proof box 10 and supporting bakery products 15.

Figure 4:
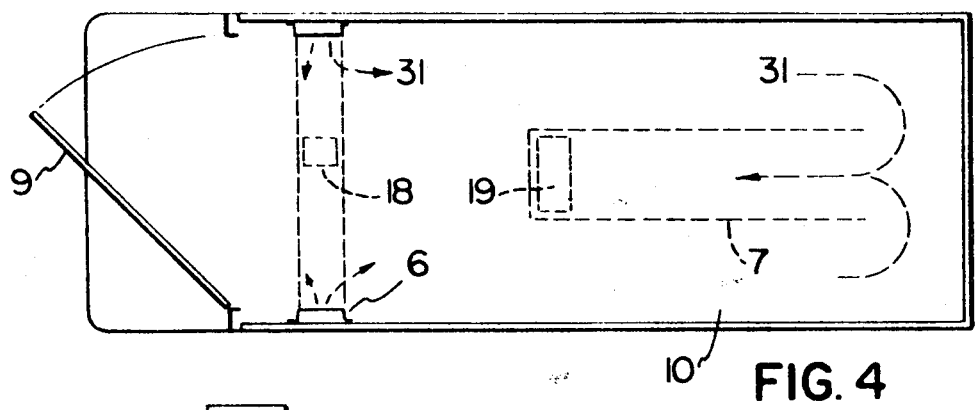
FIG. 4 illustrates the air ducts in the top and side walls of the proofing apparatus of FIG. 1.
Figure 5:
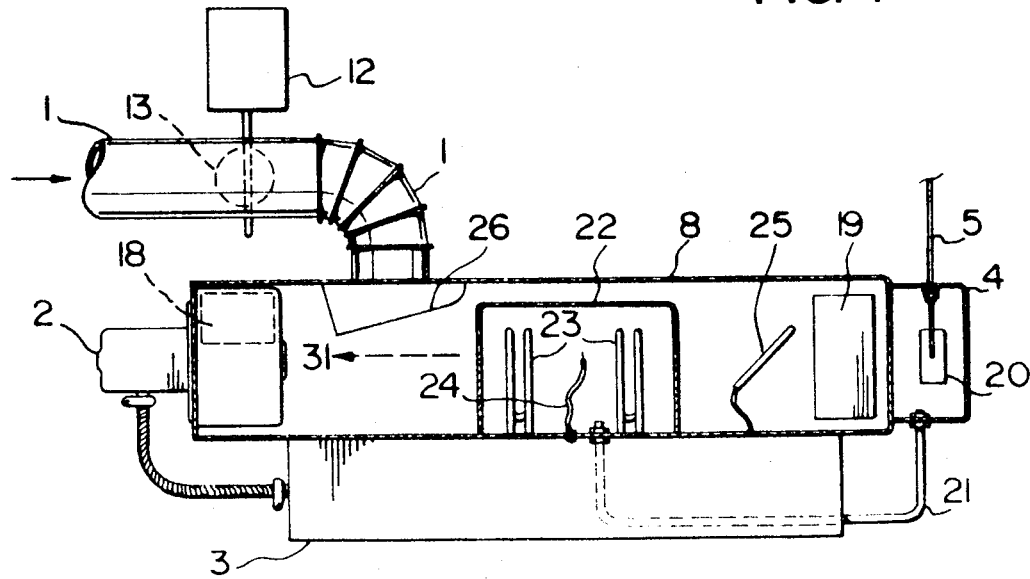
FIG. 5 is a plan of the interior of the proofing apparatus of FIG. 1.

The hot air obtained from conduit 1 is circulated by recirculating fan 17 driven by motor 2 (see FIG.1) through opening 18 and air plenum 6 to the bottom of proof box 10. The hot air exiting from plenum 6 rises through the proof box 10 as indicated by broken arrow 31. With reference to FIGS. 4, 5, and 6, the hot air reaching the top of the proof box 10 enters return air duct 7 located at the top of the proof box as shown. The air entering return duct 7 returns to the recirculating fan 17 via an opening 19 which opens into an enclosure 8 (FIG. 5) for housing the components outside the proof box including fan 17 and which further serves as a return air manifold, the interior of which communicates with the inlet to recirculating fan 17. The air circulation cycle is thus repeated. Suitable recirculating fans and motors are commercially available, for example, a Delhi utility blower model D530 working at 1,550 RPM.

The hot air circulation is required to initially raise the temperature of the proof box 10 to a predetermined value, for example 38° C., and then to maintain this temperature for a predetermined length of time. Accordingly, the flow of hot air into the proof box 10 must be controlled.

In the embodiment of the invention shown the control of the hot air flow is effected in the following manner with reference to FIGS. 3, 5 and 6.

The temperature of the proof box 10 is monitored by a temperature sensing device 25. When the temperature of the proof box 10 falls below a predetermined value the temperature sensing device 25 alerts an automatic temperature control mechanism 27, which in turn controls a damper control 12. Damper control 12 then opens a damper 13, as required, to allow the hot air inside conduit 1 to enter into the proof box 10 via duct 26 by means of the recirculating process described above. Once the temperature of the proof box 10 has equilibriated at the predetermined value the components 25, 27, 12 and 13 cooperate to stop the flow of hot air into proof box 10. In a particularly preferred embodiment, temperature sensing device 25 is located in a position to sense the temperature of the circulating hot air as it is about to enter fan 17 after having diffused through proof box 10.

The temperature sensing device 25 and the automatic temperature control mechanism 27 can be, for example, an ambi stat # L 6008C-1107 from Honeywell, Minneapolis, Minn. 55408, U.S.A. Damper control 12 can be, for example, an electric or air operated motor of valve. A suitable commercially available electric damper motor is, for example, produced by Honeywell under the designation tradeline M436A1116. The damper 13 can, for example, be a valve.

In order to control the air pressure inside the proof box 10 air outlets from the proof box 10 can be provided, for example, below door 9.

If the heat source 11 is a baking oven then the temperature inside the steam dome of the baking oven will generally be in the range of about 150° C. to about 315° C. depending on the product being baked. If a baking oven is used as the heat sourse 11 then the hot air entering proof box 10 will contain some humidity from the baking oven steam dome. However, as noted previously the relative humidity of the proof box 10 requires to be controlled. In the embodiment of the invention described above the relative humidity of the proof box 10 is controlled as follows with reference to FIGS. 5 and 6.

A water tank 22 is provided with two immersion heaters 23 which are energized by a humidistat 30. Humidistat 30 detects the relative humidity of the proof box 10 since it is located within the proof box 10. If the relative humidity of the proof box 10 falls below a predetermined level, for example 90%, the humidistat 30 energizes immersion heaters 23 which boil the water inside water tank 22 thus creating steam which is then circulated throughout the proof box 10 by the circulating hot air. Water is supplied to water tank 22 via u-tube 21. The level of water in the water tank 22 is controlled by water float box 4 comprising a water inlet line 5 which is controlled by water level float 20. Commercially available examples of suitable immersion heaters are a 1502k and a 2002k immersion heater from Temro, P.O. Box 962, Winnipeg, Manitoba. A commercially available example of a suitable humidistat is a type W42AA humidistat from Penn-Baso Products, Goshen, Ind. 46526, U.S.A.

If the water level in water tank 22 drops for any reason, for example due to a blockage in the water supply lines, the immersion heaters 23 may be damaged and a safety hazard may arise. Accordingly, a low water immersion heater de-energizing or cut-out system is desirable. An example of such a system is shown in FIGS. 5 and 6. Water level probe 24 detects the level of water in water tank 22 and at a predetermined level triggers electric relay 28 and immersion heater power cut-off 29. Accordingly, the immersion heaters 23 are de-energized if the water level reaches a predetermined level in the water tank 22. A commercially available example of a suitable electric relay is produced by Potter Brumfield under the designation PRD 7AY0-120; and a commercially available example of a suitable immersion heater power cut-off is produced by Charles F. Wanrick Co., Berkley, Mich. 48072, U.S.A., under the designation IDIDO 115 V/60, secondary 300V.

An example of the water level probe 24 is illustrated in FIG. 7. An electrode 33 signals a predetermined low level of water in water tank 22 to electric relay 28 and immersion heater power cut-off 29. Tank 22 is earthed as shown at 34 and electrode 33 is insulated from tank 22 by insulating packing 32. The electrode 33 is suitably made from, for example, brass.

In a preferred embodiment, water tank 22 is located in a position so that the circulating hot air as it is about to enter fan 17 after having diffused through proof box 10 passes over it.

Reference 3 in the drawings indicates an electrical control box.

Figure 8:
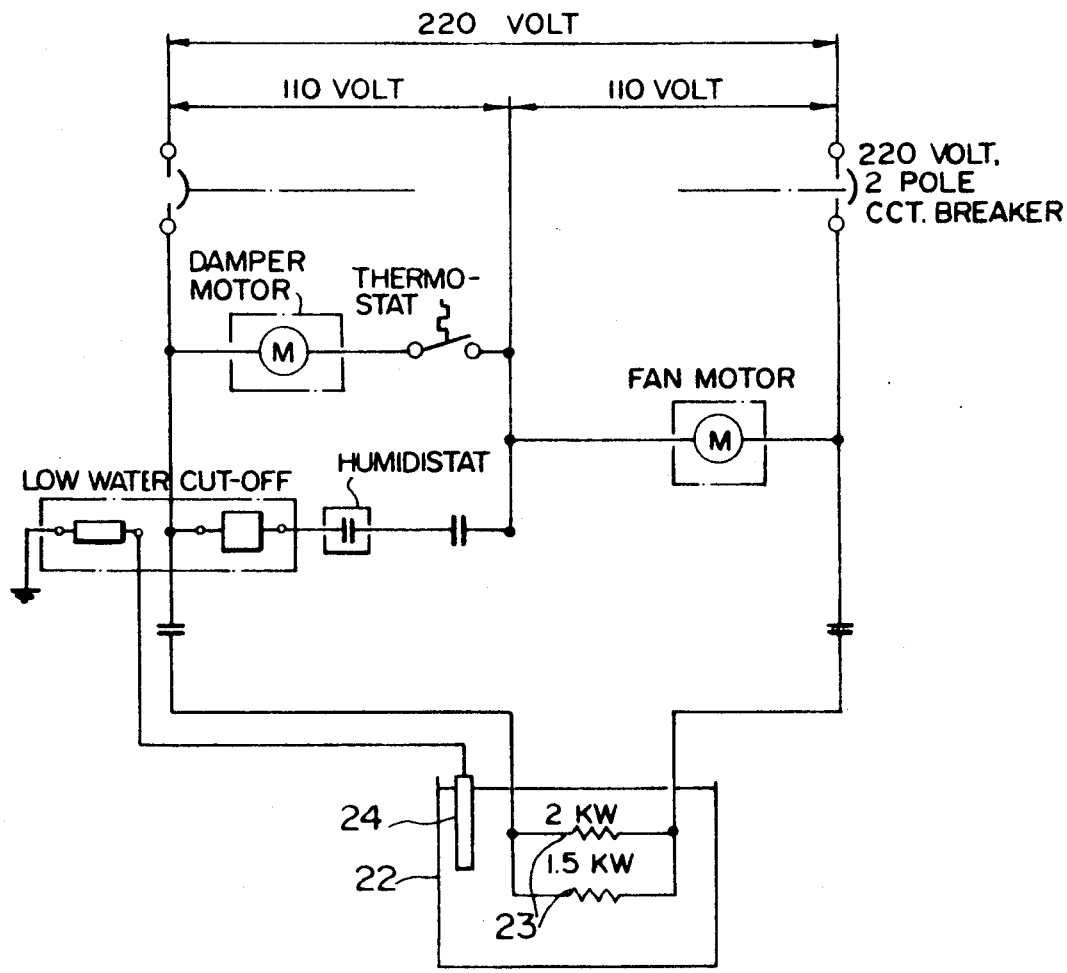
FIG. 8 is a circuit diagram for the proofing apparatus of FIG. 1.

A person skilled in the art will readily appreciate that the electrical power supply and control of the various components of proof box 10 can be effected in a number of different ways. However, one possible circuit diagram is shown by way of example in FIG. 8.

The proof box described herein maintains a sufficiently constant environment with respect to temperature and relative humidity throughout a period for rising dough that the dough can be removed from the proof box after a predetermined length of time therein without visual inspection thereof. It is merely necessary to calibrate the proof box with a particular type of dough i.e. considering such variables as dough consistency, mass and the like and then to use the calibration time as a time interval for rising other similar batches of dough.

Timing can be effected with any conventional timer attached to or separate from the proof box. Bakery efficiency and product control are improved by using the above described timing procedure rather than repeated visual inspections of the dough.

It will be clear that the basic concepts of the invention can be effected with apparatus other than the embodiment described in detail above. For example, the hot air could be supplied at a point substantially at the bottom of the proof box, collected at the top of the proof box and returned to the hot air supply conduit for recirculation.

I claim:

1. A proofing apparatus for rising dough, comprising: an enclosure for containing dough;
manifold means provided outside said enclosure and including therein means for circulating hot air within said enclosure, said manifold means having
(a) an outlet communicating with a hot air supply inlet opening into the interior of said enclosure and an inlet communicating with a hot air outlet opening from the interior of said enclosure;
(b) blower means having an outlet communicating with said manifold outlet for directing hot air into said enclosure via said hot air supply inlet and an inlet communicating with the interior of said manifold means for drawing air from said enclosure via said hot air outlet thereof;
(c) a hot air supply duct opening into the interior of said manifold for connecting said manifold means to an external source of hot air, said hot air from said external source being drawn into said manifold means by said blower means;

(d) control means responsive to means for sensing the temperature in the interior of said enclosure for regulating the inflow of the hot air through said supply duct into said manifold means in accordance with the temperature sensed by said means for sensing temperature; and (e) means for humidifying the hot air passing through said manifold means into said enclosure.

2. The proofing apparatus of claim 1 wherein said humidifying means comprise:

a water tank positioned in said manifold means;

water supply means to said water tank;

an immersion heater energized by humidity sensing means for sensing the humidity of the air in said enclosure; and said water tank being located within said manifold means so that the water vapour evolved therefrom is carried by the hot air passing through said manifold means into said enclosure.

3. The proofing apparatus of claim 2 wherein said temperature sensing means are located within said manifold means adjacent the inlet thereto to sense the temperature of the air leaving said enclosure via said hot air outlet thereof.

4. A proofing apparatus as defined in claim 3, wherein said enclosure is insulated.

5. The proofing apparatus of claim 2 wherein said control means include damper means located within said supply duct, said damper means being actuatable between an open and closed position for regulating the inflow of hot air through said supply duct.

6. The proofing apparatus of claim 2 wherein said hot air supply inlet includes air plenum means extending down the sides of said enclosure for delivering said hot air to the bottom thereof.

7. The proofing apparatus of claim 6 wherein said hot air outlet includes a return duct disposed along the upper, inner surface of said enclosure.

8. A proofing apparatus as defined in claim 7, wherein said hot air supply source is a baking oven.

9. The proofing apparatus of claim 7 wherein said water tank is positioned between said inlet and said outlet of said manifold means.

10. The manifold of claim 7 wherein said humidifying means comprise a water tank positioned in said manifold, water supply means to said water tank, an immersion heater energized by humidity sensing means for sensing the humidity of the air passing through said manifold and said water tank being located within said manifold so that the water vapor evolved therefrom is carried away by the hot air passing through said manifold.

11. A manifold for use with dough proofing apparatus including an enclosure for containing dough, said manifold being provided outside said enclosure and comprising:

(a) an outlet for directing hot air to the interior of said enclosure and an inlet for drawing air from the interior of said enclosure;

(b) blower means having an outlet communicating with said manifold outlet for directing hot air therethrough and an inlet communicating with the interior of said manifold for drawing air from said enclosure into said manifold;

(c) a hot air supply duct opening into the interior of said manifold for connecting said manifold to an external source of hot air, said hot air from said external source being drawn into said manifold by said blower means;

(d) control means responsive to means for sensing the temperature in the interior of said enclosure for regulating the inflow of the hot air through said supply duct into said manifold in accordance with the temperature sensed by said means for sensing temperature; and (e) means for humidifying the hot air passing through said manifold.

* * * * *

UNITED STATES PATENT AND TRADEMARK OFFICE
CERTIFICATE OF CORRECTION

PATENT NO. : 4,483,243

DATED : November 20, 1984

INVENTOR(S) : Allan A. Cote

It is certified that error appears in the above-identified patent and that said Letters Patent is hereby corrected as shown below:

First page, first col., following Item [22], insert --[30] Foreign Application Priority Data Feb. 26, 1981 Canada.........371,863; and Col. 3, line 22, "of" should read --or--.

Signed and Sealed this

Sixth Day of August 1985

[SEAL]

Attest:

DONALD J. QUIGG

Attesting Officer

Acting Commissioner of Patents and Trademarks